Feb. 2, 1960

K. J. DINARD 2,923,499

ANTI-STALL SYSTEM FOR AIRPLANES

Filed May 31, 1957

INVENTOR.
KENNETH J. DINARD
BY
ATTORNEYS.

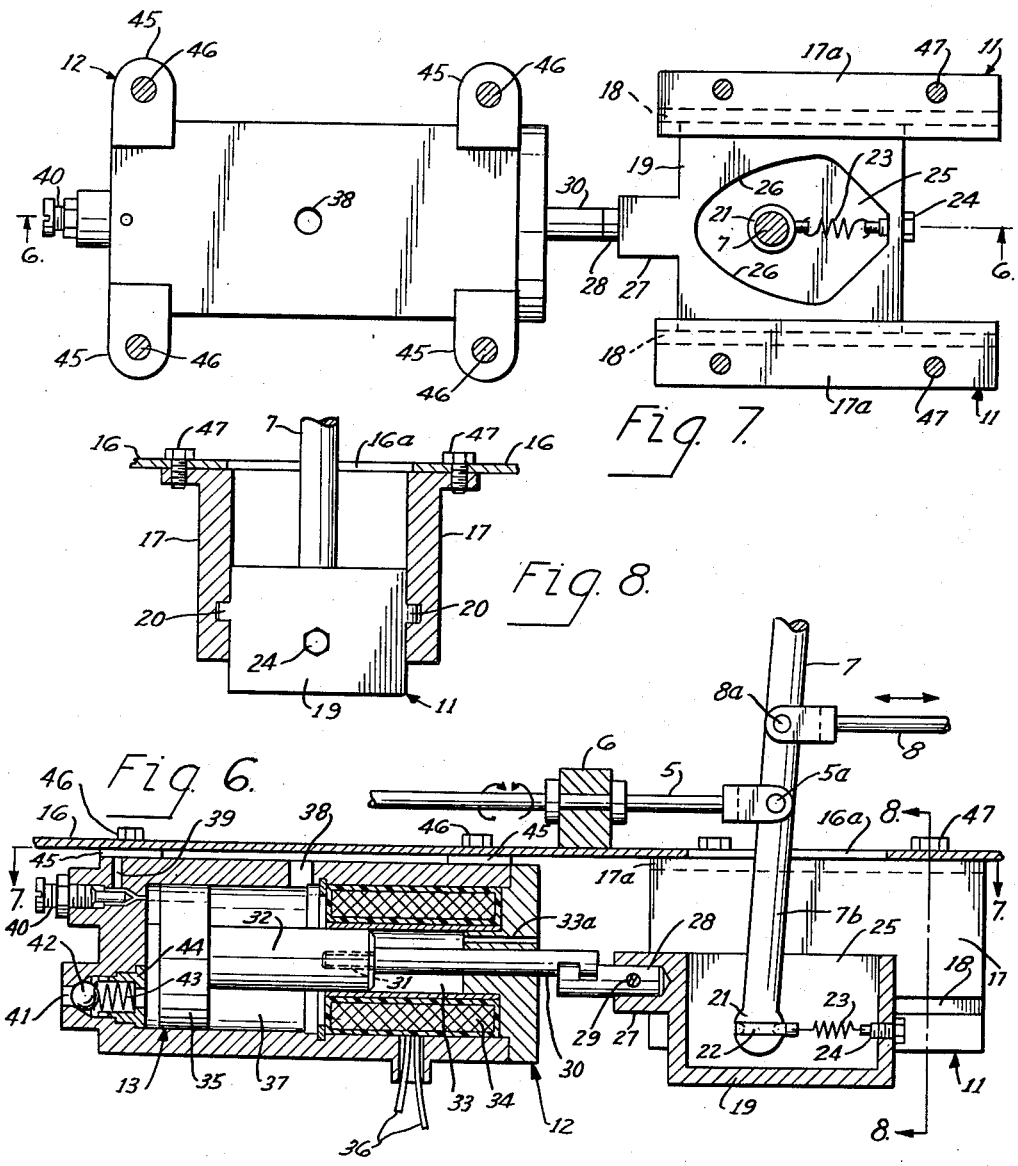

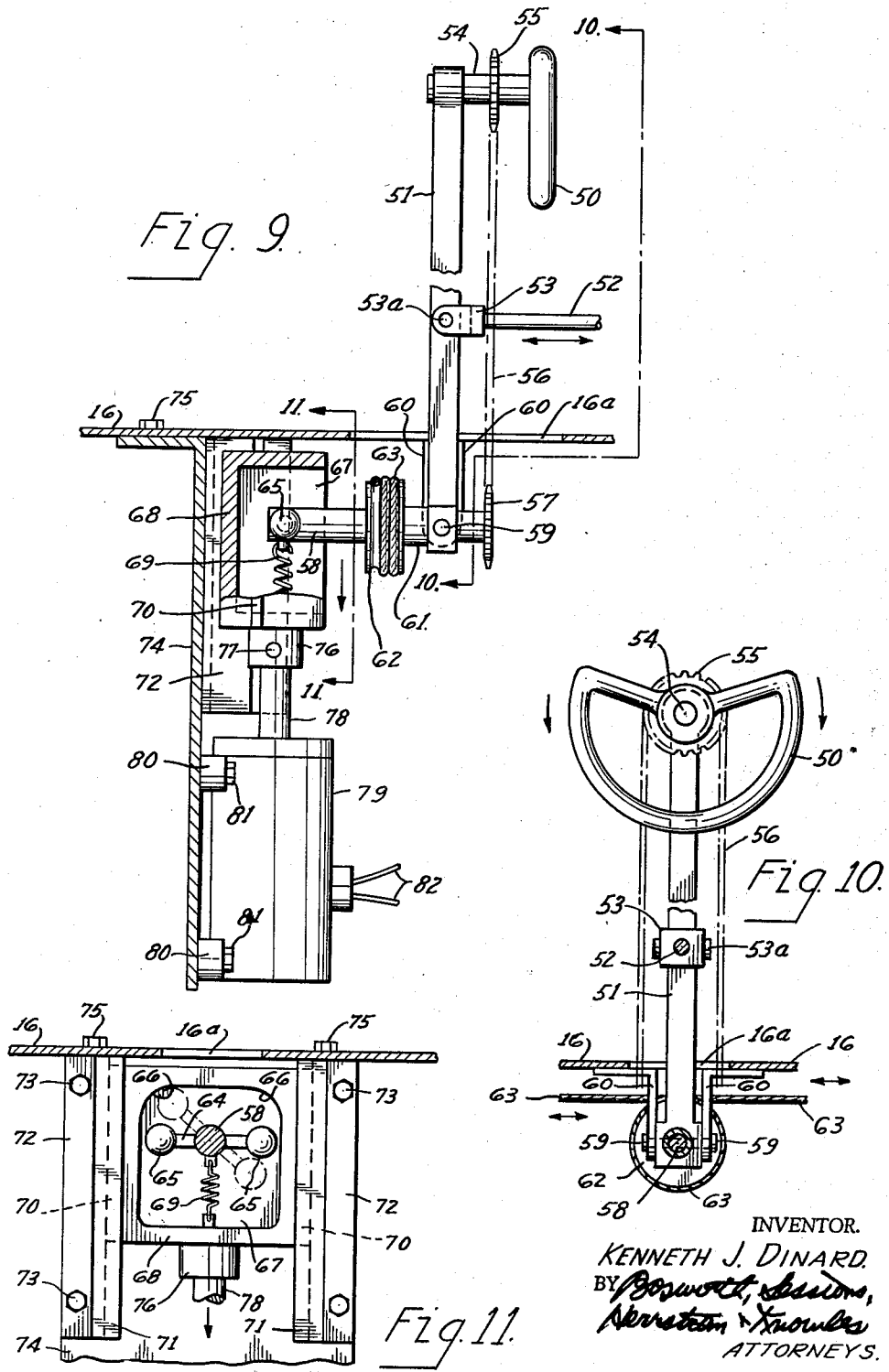

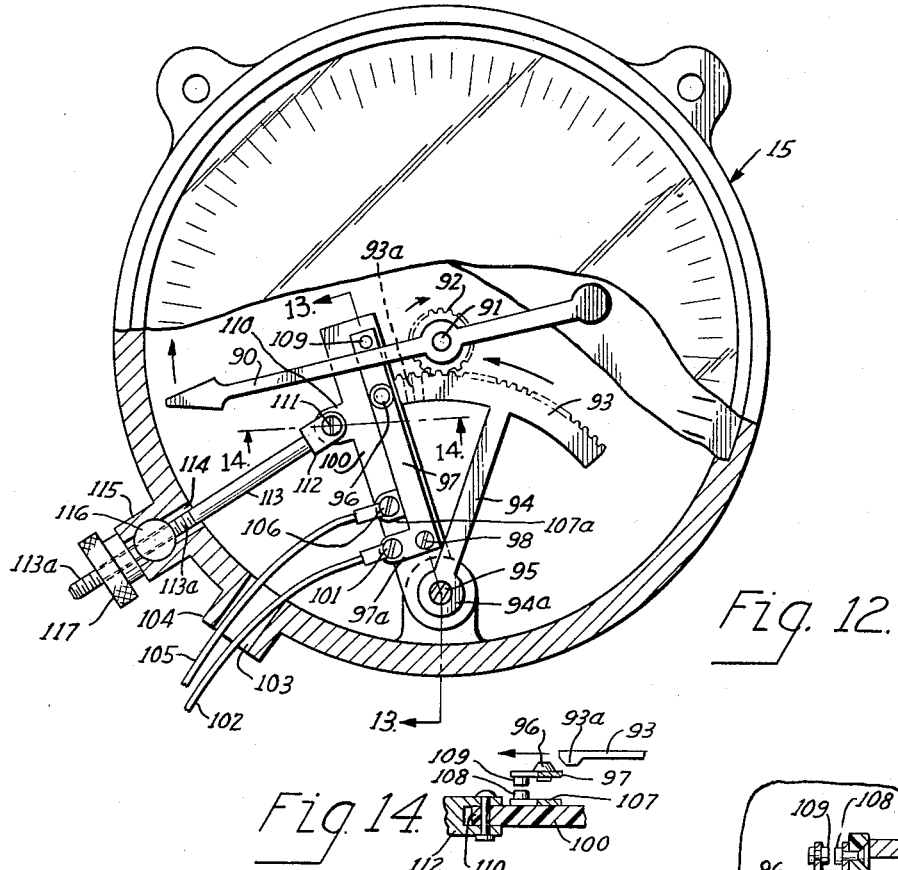
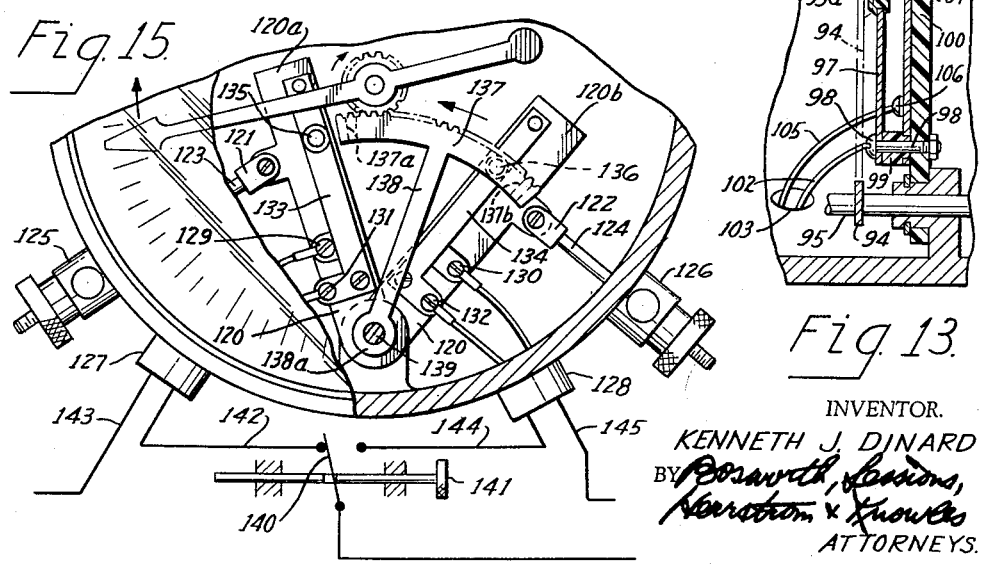

United States Patent Office 2,923,499
Patented Feb. 2, 1960

2,923,499
ANTI-STALL SYSTEM FOR AIRPLANES
Kenneth J. Dinard, Cleveland, Ohio
Application May 31, 1957, Serial No. 662,838
6 Claims. (Cl. 244—76)

This invention relates to a control system for aircraft of the heavier-than-air type.

The conventional airplane is provided with various movable airfoils other than the wing itself; for example, elevators, ailerons, wing flaps and the like. The proper use of these movable airfoils requires the exercise of judgment by the pilot, for their misuse can quickly cause a condition in which the airplane will no longer operate as desired. An example is stalling of the kind that tends to occur if, at an air speed below a predeterminable minimum, the pilot operates the elevators in such manner as to bring about too steep a climb. A like condition obtains during landing, when their operation at a time when the airplane lacks sufficient forward speed can cause the airplane to stall.

The present invention has for its principal object to provide a control system that prevents erratic flight as a result of injudicious action by the pilot, as in seeking to put the airplane into a steep climb at a time when the forward speed of the airplane is below a safe minimum. To this end, the invention provides automatic means for over-riding the action of the pilot. Thus a correction can be brought about regardless of the action or non-action of the pilot, giving him an opportunity, if he desires to avail himself of it, to increase the forward speed of the airplane to a point where it becomes feasible to climb at the contemplated angle.

A further object of the invention is to provide a system of this kind in which certain components of a performance indicator; e.g. the airspeed indicator, are coupled to major components of the system as a whole. With this in mind, the airspeed indicater can be and preferably is provided with means by which, at a predetermined air speed, a circuit is established or dis-established which has the function of bringing over-riding means into effective operation. For example, by incorporating in the airspeed indicator fixed and movable contacts by means of which an electrical circuit may be made or broken it is possible, in a simple, practical way, to initiate a high degree of automatic control over the operation of the airplane.

Other objects, advantages and features of the invention will be apparent from the description which follows and from the accompanying drawings, in which:

Figure 6 is a section with parts in elevation through a portion of the airplane showing certain of the components of the control system.

Figure 7 is a plan on line 7—7 of Figure 6.

Figure 8 is a section on line 8—8 of Figure 6.

Figure 9 is a section with parts in elevation through a portion of an airplane embodying a second preferred form of the invention.

Figure 10 is an elevation of certain parts of the control system as seen from line 10—10 of Figure 9.

Figure 11 is an elevation of certain other parts of the control system as seen from line 11—11 of Figure 9.

Figure 12 is an elevation of an airspeed indicator incorporating certain features of the invention.

Figures 13 and 14, respectively, are sections on lines 13—13 and 14—14 of Figure 12.

Figure 15 is an elevation of a modified form of airspeed indicator.

Figure 1:
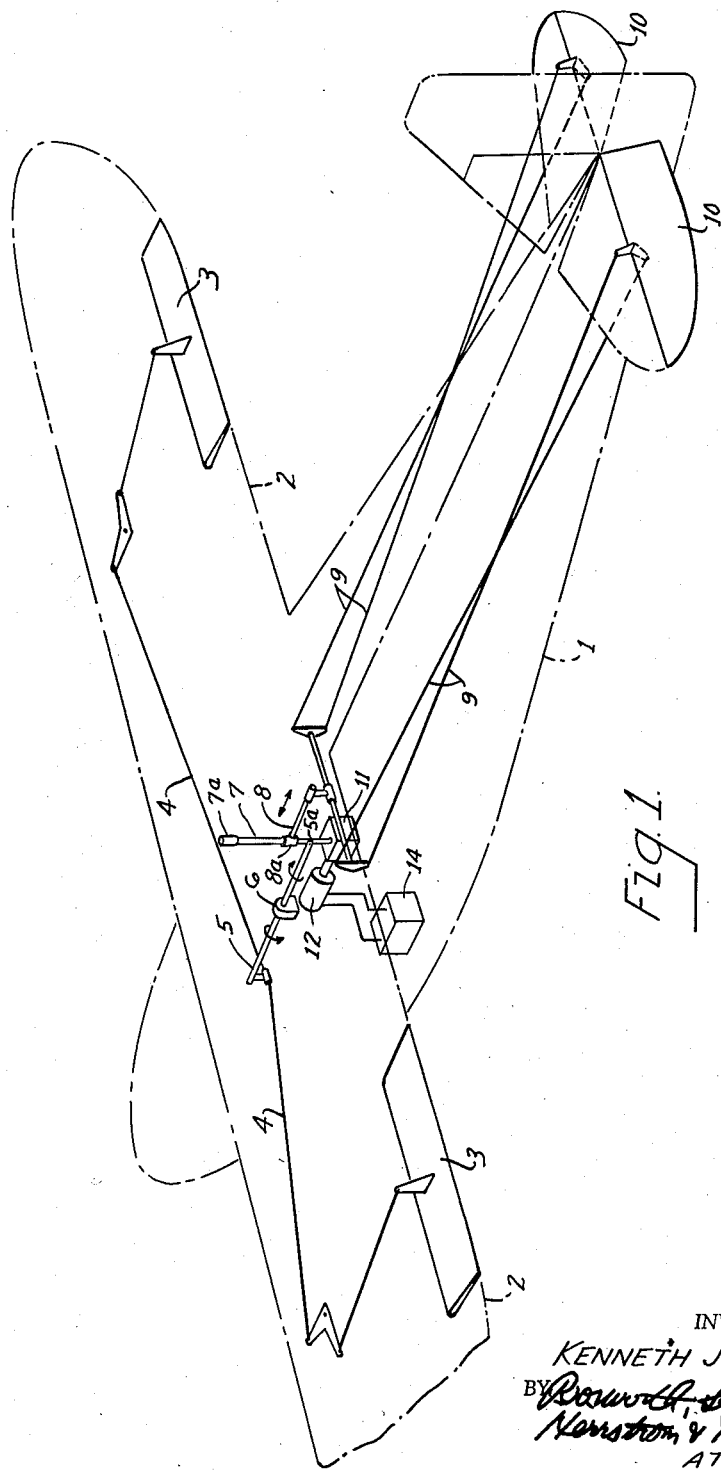
Figure 1 is a schematic representation of an airplane embodying the control system of the present invention.

What is shown in Figure 1 is an airplane provided with a conventional fuselage 1, a conventional wing 2, and, at the trailing edge of the wing, manually movable airfoils taking the form of ailerons 3. The latter are connected by a series of links and levers, indicated generally at 4, to a forwardly directed horizontally extending rod 5 adapted for rotation, clockwise and counter-clockwise, in a steady bracket 6. At 5a rod 5 is pivoted to a manually operated control device 7, here shown as a stick surmounted by a handle 7a, by means of which rod 5 may be rotated. This rotation of rod 5 in either clockwise or counter-clockwise direction produces movement of ailerons 3.

Also connected to stick 7 is a rearwardly directed horizontally extending rod 8. It is pivoted to stick 7 at 8a to permit forward and rearward movement with stick 7. Rod 8 is connected to a system of links and levers, generally designated 9, through which a second set of airfoils, in this case elevators 10, may be raised and lowered. As will be apparent from Figures 1 to 5, forward movement of stick 7 brings about a lowering of the elevators; rearward movement, a raising of the elevators.

Figure 2:
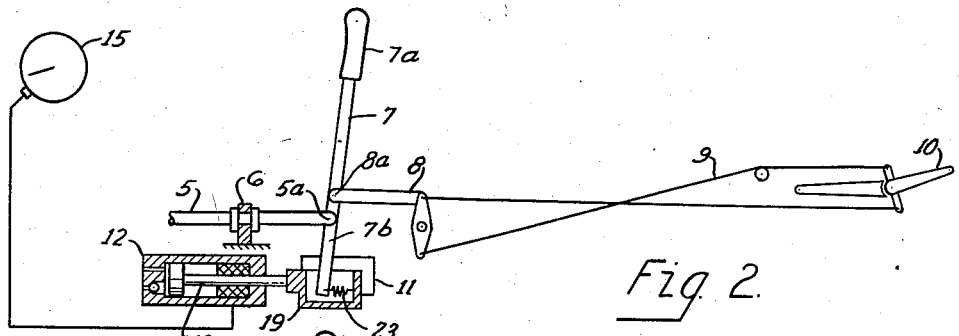
Figures 2 to 5 are diagrammatic views illustrating the operation of the control system in one of its preferred forms.
Figure 3:
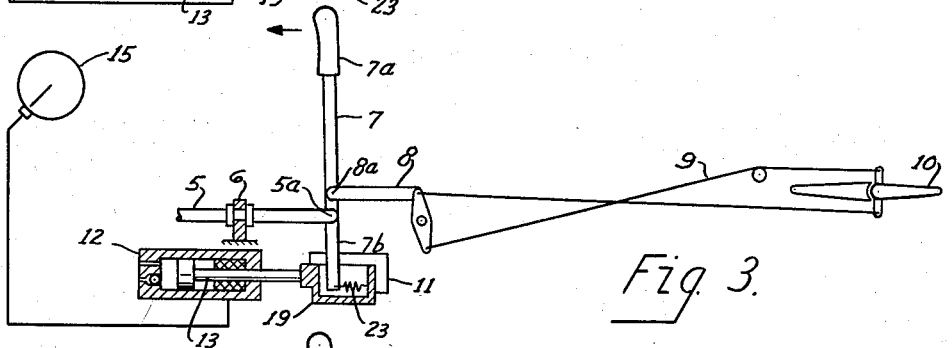
Figure 4:
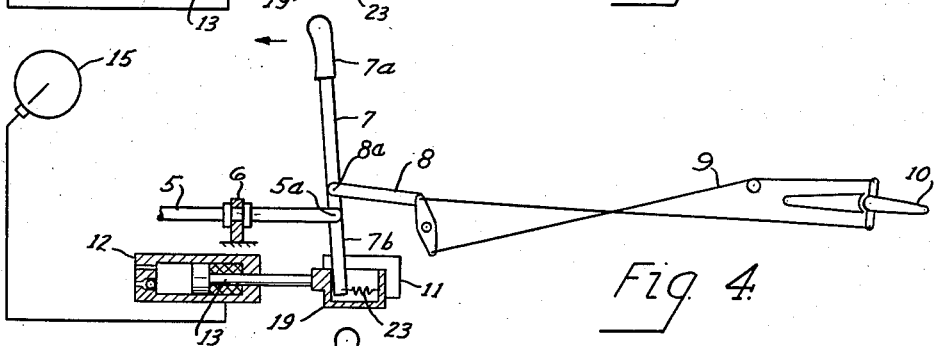
Figure 5:
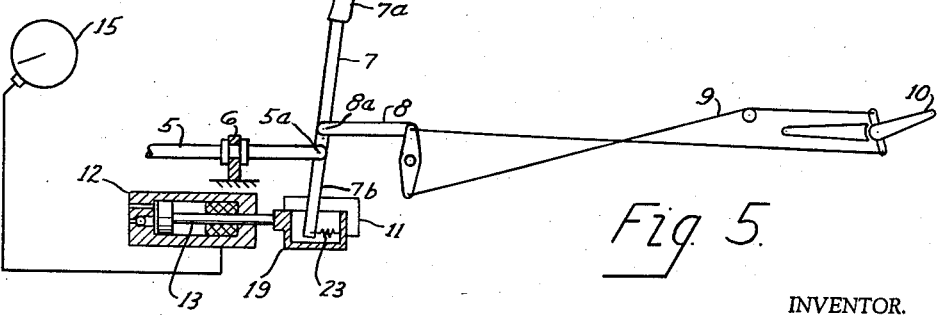

Adverting now to Figures 2 to 5, what is shown in Figure 2 is the control system of the invention at a time when elevators 10 are being held by the pilot in their raised position, thus causing the plane to climb. In Figures 3 and 4, the angle of attack is being decreased automatically by lowering elevators 10 through the action on stick 7 of certain of the mechanical components of the system. Figure 5 illustrates how, by pulling rearwardly on stick 7, the pilot may restore the parts to the original positions after the angle of attack has been reduced to a safe value. If in the meanwhile the pilot increases the air speed, as he should do, the airplane will then climb normally.

Referring again to Figure 1, it will be noted that stick 7 extends downwardly into a housing 11 which, as will appear from the detailed description which follows, takes the form of a bracket-like support for multiple range stop means later to be described. Forwardly of housing 11 is a housing 12 for a solenoid. Connected to the coil in the solenoid in such manner as to bring about movement of plunger 13 (Figures 2 to 5) is a storage battery 14. The electrical circuit connecting the solenoid and the battery includes leads (represented diagrammatically in Figures 2 to 5) extending to a panel-mounted airspeed indicator 15. As will be brought out hereinafter, the latter incorporates a switch for making and breaking the circuit.

Referring now to Figures 6 to 8, it will be observed that the lower end 7b of stick 7 projects into housing 11 through an opening 16a in floor boards 16. On opposite sides of opening 16a are mounted two bracket-like side pieces 17. Taken together, they form housing 11. On its inside face, each of the two side pieces 17 is provided with a horizontally extending guide channel 18 for slidably supporting multiple range stop means taking the form of a box-like retainer 19 of the nature of a coupling. As appears from Figure 8, coupling box 19 is provided with integrally-formed side rails 20 that ride in guide channels 18 in side pieces 17.

It will be observed from Figure 6 that stick 7 is provided on its lower end 7b with an end ball 21 in which is formed a circumferential slot for receiving a swivel ring 22. To the latter is attached one end of a coil spring 23. At its opposite end, spring 23 is attached by means of an adjustable plug 24 to the end wall of coupling box 19. The chamber 25 in coupling box 19 is more or less diamond-shaped, being formed as shown in Figure 7.

At their forward ends, the side walls of chamber 25 are curved as at 26 to form camming surfaces provided for the purpose of restoring stick 7 to upright position if it happens to be tilted out of the vertical longitudinal plane toward one or the other of the two ailerons. Movement of coupling box 19 to the right as seen in Figure 7 will bring about forward movement of stick 7 in the manner indicated in Figures 2 to 4. At the same time, if stick 7 is tilted laterally toward one or the other of the two ailerons, it will be righted by the camming action of surfaces 26.

Coupling box 19 is provided as shown in Figures 6 and 7 with a forwardly extending projection 27 in which is received a connecting shaft 28 that is held fixedly in place by a pin 29. Shaft 28 engages a rearwardly directed shaft 30 which at 31 is threaded into the proximate end of armature 32. The latter operates in a chamber 33 that is vented to the atmosphere through opening 33a. Within housing 12 is solenoid coil 34. It acts on armature 32 to draw it into retracted position in chamber 33 when the circuit connecting the battery, solenoid and airspeed indicator is closed by means of the switch in the airspeed indicator.

At its forward end, armature 32 carries a piston 35 fitting snugly against the side walls of a chamber 37 in housing 12. Piston 35 is provided in order to introduce a dashpot action into the movement of the plunger from right to left, seen as in Figures 2 to 7, inclusive. Whereas a vent 38 precludes the trapping of air and makes for free and easy movement of the plunger from left to right, a bleed opening 39 controlled by needle valve 40 makes for slow return of the plunger. A second opening 41, normally closed by a ball valve 42, permits air to be drawn into the space forward of piston 35. Ball valve 42 is urged into closed position by a light coil spring 43 in a spring retainer 44.

Housing 12 is provided with four laterally projecting ears 45, best seen in Figure 7. Bolts 46, which pass through floor boards 16 into ears 45, serve to hold housing 12 in position beneath the floor boards. Similar bolts 47 passing through the floor boards into flanges 17a on side pieces 17 serve to hold in place the bracket-like housing 11 which carries and supports coupling box 19. Housings 11 and 12 are aligned with each other as shown in Figure 7, preferably along the centerline of the airplane.

Referring again to Figures 1 to 5, if the angle of attack is too great for the air speed as determined by airspeed indicator 15, the circuit connecting the airspeed indicator, battery and solenoid is closed by operation of the switch in the airspeed indicator. This results in immediate energization of coil 34 through leads 36, which draws armature 32 from left to right, seen as in Figure 6. This movement is communicated to coupling box 19 through shaft 30 and shaft connection 28, forcing it from left to right, seen as in Figure 6. Movement of coupling box 19 first extends coil spring 23, which begins to pull on swivel ring 22 on end ball 21 at the lower end of portion 7b of stick 7. This forces stick 7 to move counter-clockwise about pivot 5a, seen as in Figures 3 and 4, thus over-riding any action on the part of the pilot in attempting to hold back stick 7. In these circumstances, he is precluded from bringing about a stall at the prevailing air speed. He is free to increase the air speed, if desired.

Assuming that the airplane has resumed level flight and that the pilot has increased the air speed to a safe value, thus breaking the circuit connecting the airspeed indicator, battery and solenoid, the pilot may, if he wishes, again pull back on handle 7a of stick 7, thus raising elevators 10 as indicated in Figure 5. The clockwise movement so imposed on the lower end 7b of stick 7 forces coupling box 19, shaft connection 28 and shaft 30 from right to left, seen as in Figure 6. As a result, armature 32 and piston 35 also are forced from right to left. Because of the previously described dashpot action, this movement is relatively slow, being dependent on the rate of escape of air past needle valve 40 in bleed opening 39.

In the embodiment of the invention illustrated in Figures 9 to 11, the airplane is operated by the pilot by means of a wheel 50 mounted on a wheel column 51 to which is connected a rearwardly extending control rod 52. Like control rod 8 in the previously described embodiment of the invention, the latter is connected to the elevators. At its forward end, it carries a yoke 53 by which, aided by pin 53a, rod 52 and wheel column 51 are pivotally inter-connected. The wheel is mounted on a rotatable shaft 54 at the top of the wheel column. Shaft 54 also carries a sprocket 55 connected by chain 56 to a like sprocket 57 on a rotatable shaft 58 at the lower end of the wheel column. Pivot pins 59 journaled in brackets 60, seen in Figure 10, permit movement of wheel column 51 in both forward and backward directions about the common axis of the two pivot pins. To this end, shaft 58 passes through an opening in a block 61 at the base of wheel column 51. The connection between wheel column 51 and shaft 54 thus is such as to permit movement of the wheel column in directions paralleling the centerline of the airplane; i.e., to the right or the left, seen as in Figure 9. To provide for movement of the ailerons at the trailing edge of the wing, shaft 58 mounts a pulley 62 carrying cables 63 which extend laterally to the ailerons as indicated in Figure 10.

Mounted on the inner end of shaft 58 is a crosspiece 64 provided with end balls 65 as shown in Figure 11. Adapted to cooperate with end balls 65 are camming surfaces 66 at the top of chamber 67 in retainer 68. The latter, taking the form of a coupling box, corresponds to coupling box 19 in the previously described embodiment of the invention; however, it is supported for vertical rather than horizontal movement. A stout coil spring 69 interconnects shaft 58 and coupling box 68. At the sides of coupling box 68, seen as in Figure 11, are rails 70, one of which appears in full lines in Figure 9. These rails extend into slots 71 in two side pieces 72 of the nature of brackets which go to make up the housing for coupling box 68. Side pieces 72 are attached by bolts 73 (Figure 11) to a back plate 74, forming a part of the housing, which is itself attached to floor 16 by bolts 75.

At the lower end of coupling box 68 is a downwardly extending projection 76 in which is held, as by a pin 77, a shaft 78 that extends downwardly into solenoid housing 79. The latter is provided with ears 80 by which it is held, as by bolts 81, to back plate 74. Spring 69, which is installed under tension, tends to pull upward on shaft 78 and the plunger in housing 79. The normal position of coupling box 68, shown in Figure 9, is at the top of back plate 74. When the coupling box is in this position, wheel column 51 may be moved forwardly or rearwardly to the extent necessary to operate the elevators through rearwardly extending control rod 52. There is no possibility of interference between coupling box 68 and the elements at the forward end of shaft 58 except as camming surfaces 66 may later be brought into engagement with end balls 65.

If the pilot puts the airplane in a climb which is too steep for the air speed, thus inviting a stalling condition, the circuit leading to and from airspeed indicator 15 is closed by the switch in the airspeed indicator, as a result whereof the solenoid in housing 79 is energized. The plunger, plunger shaft and coupling box are pulled downward without regard to the wishes of the pilot, who may be disposed to pull rearwardly on wheel column 51. As in the case of the previously described embodiment of the invention, the solenoid is capable of exerting a force sufficient to overcome any rearwardly directed force likely to be exerted by the pilot. If, in the meanwhile, the wheel has been rotated to the right or left, seen as in Figure 10, camming surfaces 66, operating on one or the other of the two end balls 65, will tend to restore the wheel to the natural position shown in Figure 10.

Assuming that the condition requiring correction has been alleviated and that the pilot has increased the air speed, thus breaking the circuit connecting the airspeed indicator, battery and solenoid, the plunger in the solenoid will be released by the coil, which will no longer be energized. Thereupon spring 69, operating on coupling box 68, shaft 78 and the plunger in housing 79, will return all of these parts to the position shown in Figure 9. As in the embodiment of the invention shown in Figures 6 to 8, movement of the plunger toward retracted position is prompt; its movement back to normal position is delayed by the previously described dashpot action. The coil in the solenoid is energized and de-energized through the leads 82 shown in Figure 9, which form part of a circuit interconnecting the solenoid, battery and airspeed indicator.

A preferred form of airspeed indicator that is adapted to make and break the circuit in both embodiments of the invention is shown in Figures 12 to 14. It includes a pivotally mounted pointer 90 on a pintle 91 on which is mounted a gear 92. Meshing with the latter is a quadrant or gear segment 93 which at one end is provided with a boss 93a: see Figure 14. Gear segment 93 is carried by a supporting arm 94. The latter is provided with an enlarged end portion 94a by means of which it is mounted on a pintle 95. Air pressure differentials exerted through cooperating diaphragms (not shown) are used to rotate pintle 95. The pintle imparts a swinging movement to arm 94 and, as a result, an arcuate movement to gear segment 93.

In the path of boss 93a on gear segment 93 but not of the gear segment itself is a button 96 that is rigidly affixed to a metal spring arm 97. The latter is mounted as shown in Figure 13. By means of a non-conducting screw 98 and a non-conducting spacer 99, it is held firmly in place in spaced relation to a plastic supporting piece 100. At the lower end of spring arm 97 is an integral tang 97a. At 101 connection is made between tang 97a and one of the leads 102 forming part of the circuit which interconnects the airspeed indicator, battery and solenoid.

Lead 102 passes out of the airspeed indicator through an opening 103 in a hollow boss 104 on the frame of the indicator. The same opening accommodates a second lead 105 connected at 106 to a similar tang 107a at the lower end of a metal strip 107 that is rigidly affixed to supporting piece 100. On the upper end of metal strip 107 is a fixed contact 108 for engagement by movable contact 109 on the upper end of spring arm 97. When boss 93a on gear segment 93 engages button 96, spring arm 97 is forced toward metal strip 107, as a result whereof movable contact 109 on spring arm 97 engages and closes the circuit through stationary contact 108 on metal strip 107. The solenoid is then energized with the results already described.

For purposes of adjustment, supporting piece 100 is provided with a laterally extending ear 110, seen in Figure 12, in which is mounted a pivot pin 111. Engaging the ends of the pivot pin is a yoke 112 to which is connected a rod 113 which extends radially toward the periphery of the airspeed indicator. At 114, rod 113 projects out of an opening in a peripheral boss 115. The projecting outer end of rod 113 is threaded as at 113a. Engaging threaded portion 113a is a set screw 116. When the desired position of adjustment has been achieved, set screw 116 is urged into engagement with rod 113, after which lock nut 117 is tightened into position to keep the parts from working loose. Adjustment of the air speed at which contacts 108 and 109 will engage each other thus is made by moving arm 113 in or out of opening 114.

Using a performance indicator of the kind illustrated in Figures 12 to 14, the pilot can relay on one of the previously described control mechanisms to correct the normal tendency to stall the airplane by climbing too steeply at the pre-determined minimum air speed. If the pilot attempts to make the airplane climb at a still steeper angle, his effort as exerted on the manual control device; that is to say, stick 7 or wheel column 51, is over-ridden. Thus he cannot cause the plane to climb so steeply as to bring about a stall at the minimum air speed for which the switch in the airspeed indicator has been set. The action of the apparatus is automatic, causing a reduction of the angle of attack to some lesser angle that will not develop stalling.

In the modified airspeed indicator shown in Figure 15, two relatively movable parts, a first branch 120a and a second branch 120b, go to make up the V-shaped supporting piece 120. Coupled to branch 120a is a yoke 121; coupled to branch 120b, a similar yoke 122. The former carries an outwardly projecting rod 123; the latter, a similar rod 124. Where bosses 125 and 126 appear in Figure 15, the two rods pass through the frame of the airspeed indicator. The included angle between the two branches of V-shaped supporting piece 120 may be varied, if desired, so as to make the angle greater or smaller than that shown. This may be done by moving either branch independently of each other or both of them together through bosses 125 and 126, each of which is provided with an opening (not shown).

Suitable leads reach the lower ends of branches 120a and 120b through two bosses 127 and 128, each of which is provided with an opening (not shown). At 129 and 130, two of these leads connect with metal strips similar to metal strip 107. At 131 and 132, two other leads connect with spring arms 133 and 134 similar to spring arm 97. Spring arm 133 carries a button 135; spring arm 134, a button 136. Adapted to engage buttons 135 and 136 is a gear segment 137 having at its two ends bosses 137a and 137b. Acting on one or the other of buttons 135 and 136, depending on the direction of movement, bosses 137a and 137b force one or the other of spring arms 133 and 134 into engagement with one or the other of the two metal strips. Gear segment 137 is carried by an arm 138 provided with an enlarged portion 138a that is mounted for rotation with a pintle 139. The action is similar to the action characterizing the airspeed indicator of Figures 12 to 14 except that gear segment 137 is adapted to close the circuit either at its left hand end or at its right hand end, seen as in Figure 15.

By operating a switch 140 that is coupled to the manual control 141 by which the wing flaps are actuated, the pilot can establish a first circuit through leads 142 and 143 and those components of the airspeed indicator that are associated with branch 120a or a second circuit through leads 144 and 145 and the components of the airspeed indicator associated with branch 120b. Utilizing the first circuit, he can introduce the desired safeguard with the wing flaps raised; the second, with the wing flaps lowered. To make this possible, it is desirable that supporting piece 120 be provided with second branch 120b as well as first branch 120a.

The purpose of having a separate circuit to operate with wing flaps lowered is to take advantage of the improved lift characteristics generally attained with that condition. With wing flaps lowered, the airplane can fly at a slower speed without stalling; therefore, the control system should be set to operate at a correspondingly slow speed. Wing flaps are used in landing and sometimes at take-off; i.e., when the forward speed is relatively low. Retracting them in the usual way at the proper time results in re-establishing and thus making it possible to close the original circuit through the components associated with branch 120a in the manner already explained.

It will be apparent that changes in what has been described and shown may be made without departing from the spirit of the invention. Thus it is possible to use other coupling means than the hereinabove described coupling boxes for connecting the manually operated control column and the motor means by which the control column is moved. Such motor means need not necessarily take the form of a solenoid but may, if desired, take the form of means of some other kind capable of producing the desired movement; further, the motor means may, if desired, be of a kind operating indirectly on the major mechanical components of the system. Other changes in the system and in its components, including the performance indicator, may be expected of those skilled in the art to which the invention relates.

It is intended that the patent shall cover, by summarization in appended claims, all features of patentable novelty residing in the invention.

What is claimed is:

1. In an aircraft of the heavier-than-air type, an airframe provided with a performance-indicating instrument; an airfoil which forms part of but is movable in relation to the airframe as a whole; means positively connected to the airfoil for producing movement of the airfoil, such means including a manually operable control device accessible to the operator of the aircraft; multiple range stop means movably positioned to limit operation of the control device to which the control device is mechanically connected; motor means connected to the stop means; and an electrical circuit for actuating and deactuating the motor means that is cut into and out of operation under predetermined flight conditions by said performance-indicating instrument.

2. An aircraft as in claim 1 in which the stop means take the form of a box-like retainer receiving a portion of the manually operable control device.

3. An aircraft as in claim 1 in which the stop means are provided with camming surfaces for engaging a portion of the manually operated control device.

4. An aircraft as in claim 1 in which the motor takes the form of a solenoid provided with a retractable armature operating within a stationary coil.

5. An aircraft as in claim 4 in which the solenoid is provided with means for facilitating movement of the armature into its retracted position.

6. An aircraft as in claim 4 in which the solenoid is provided with means for delaying return of the armature to non-retracted position.

References Cited in the file of this patent

UNITED STATES PATENTS

| | | |
|---|---|---|
| 1,832,159 | Vanderlip | Nov. 17, 1931 |
| 1,897,285 | Veit | Feb. 14, 1933 |
| 2,265,524 | Fruth | Dec. 9, 1941 |
| 2,297,412 | Hoppe | Sept. 29, 1942 |
| 2,630,284 | Feeney | Mar. 3, 1953 |
| 2,678,177 | Chenery et al. | May 11, 1954 |
| 2,780,686 | Elliott | Feb. 5, 1957 |
| 2,798,911 | Howard | July 9, 1957 |